Patented Oct. 22, 1929

1,732,392

UNITED STATES PATENT OFFICE

RUDOLF WIETZEL, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF ESTERS

No Drawing. Application filed September 28, 1926, Serial No. 138,341, and in Germany October 5, 1925.

The formation of esters from acids and alcohols does not, generally, take place with theoretical yields, an equilibrium between alcohol and acid on the one hand and ester and water on the other hand being established. It has repeatedly been proposed to remove the water formed in the reaction by the addition of water-binding agents such as concentrated sulphuric acid and thereby to displace the equilibrium in favour of the formation of ester. But for this purpose considerable quantities of sulphuric acid are necessary, whereby other drawbacks are caused. It has also been suggested to remove the water by distillation together with an excess of alcohol and with or without employing an additional liquid. In this case, however, it is necessary to recover the alcohol distilled over for further use by a separate operation in a troublesome manner.

I have now found that esters can be produced in a very advantageous manner by heating, at a pressure above atmospheric pressure, a mixture of alcohol and acid together with an additional liquid not miscible with water but of such a character as to form a vapor mixture with water the vapor tension of which equals atmospheric pressure at a temperature below the boiling point of each of the components. In this manner any water present or formed is distilled off together with the additional liquid, but without any considerable amount of alcohol being distilled over. When the pressure is sufficiently high, for example 12 or 15 atmospheres, practically no alcohol distils over. Generally speaking, the results become more favourable with an increase of the pressure. Care must also be taken that the temperature of the vapour mixture containing water is equal to the boiling point of the binary mixture of water and the additional liquid, as too much alcohol is carried away, if the temperature of the vapour mixture is higher than the boiling point of the said binary mixture. As when working according to this invention practically no alcohol is distilled over, it is not necessary to employ an excess thereof.

In case the speed of the esterification is too low, the process may be accelerated by adding catalysts such as mineral acids, pyridine and its homologues or neutral inorganic salts, and such additions do not interfere with the removal of water by the additional liquid. Generally an addition of 1 per cent or even less of for example sulphuric or phosphoric acid will be sufficient.

As additional liquids to be employed according to my invention, for example benzene, toluene, carbon tetrachlorid, hexane or similar liquids not miscible with water are very suitable. It is advantageous to return the additional liquid after separating it from the condensate of the vapours to the reaction mixture either continuously or periodically, as in this case only a comparatively small amount of the additional liquid is required. This manner of working has the further advantage that small quantities of ester, which may be distilled over with the additional liquid, are not lost, but are also returned to the reaction mixture.

In case the ester obtained by the process here described is refined by distillation, the first runnings containing small quantities of the additional liquid and the last runnings containing in some cases a little sulphuric acid, are preferably added to a fresh charge of initial materials in order to avoid any losses in ester.

The process here described is applicable in the production of all kinds of esters both of inorganic and organic acids, for example of esters of boric acid, of ethyl acetate, methyl butyrate, butyl formate and so forth, and also when an alcohol is partly oxdized to an acid and the resulting mixture of alcohol and an acid is subjected to esterification.

The following example will further illustrate how the present invention may be carried out in practice, but the invention is not limited to this example.

*Example*

Ethyl alcohol and phthalic anhydride in theoretical proportions are heated to the boil under a pressure of between 15 and 20 atmospheres in a reaction vessel capable of withstanding pressure and provided with a distillation column, while benzene is continuously introduced. A mixture of benzene, water and very small quantities of ethyl alcohol distils over which, in the receiver, separates into two layers. The aqueous layer is removed, while the benzene layer is returned into the reaction vessel.

The reaction is finished, when water no longer distils over. By distilling off the remainder of benzene, diethyl phthalate is obtained which, if desired, may be purified in any suitable manner.

Other esters can be prepared in an analogous manner.

What I claim is:

1. The process of producing esters which comprises heating a mixture of an alcohol and an acid with an additional liquid not miscible with water, but capable of forming a mixture with water with a boiling point below that of each of the components at a pressure appreciably above atmospheric pressure, in such a manner that the water is distilled off together with the additional liquid, but without any considerable amount of the alcohol.

2. The process of producing esters which comprises heating a mixture of an alcohol and an acid with an additional liquid not miscible with water, but capable of forming a mixture with water with a boiling point below that of each of the components at a pressure between about 12 and 15 atmospheres in such a manner that the water is distilled off together with the additional liquid, but without considerable amounts of the alcohol, while separating the additional liquid from the distillate and returning it into the reaction mixture.

3. The process of producing esters which comprises heating a mixture of an alcohol and an acid with an additional liquid not miscible with water, but capable of forming a mixture with water with a boiling point below that of each of the components at a pressure between about 12 and 15 atmospheres, in such a manner that the water is distilled off together with the additional liquid, but without any considerable amount of the alcohol, the reaction being carried out in the presence of a catalyst.

4. The process of producing esters which comprises heating a mixture of an alcohol and an acid with benzene at a pressure between 12 and 15 atmospheres in such a manner that the water is distilled off together with benzene, but without any substantial amount of the alcohol.

In testimony whereof I have hereunto set my hand.

RUDOLF WIETZEL.